United States Patent
Hao et al.

(10) Patent No.: US 7,788,064 B1
(45) Date of Patent: Aug. 31, 2010

(54) FOCUS-BASED VISUAL ANALYTIC TECHNIQUES FOR EXPLORING DATA RELATIONSHIPS

(75) Inventors: Ming C. Hao, Palo Alto, CA (US);
Umeshwar Dayal, Palo Alto, CA (US);
Martha Lyons, Sunnyvale, CA (US);
Daniel A. Keim, Steisslingen (DE);
Dominik Morent, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 628 days.

(21) Appl. No.: 11/796,814

(22) Filed: Apr. 30, 2007

(51) Int. Cl.
*G06F 19/00* (2006.01)
(52) U.S. Cl. ...................................................... 702/179
(58) Field of Classification Search ................ 702/179, 702/182–185, 188
See application file for complete search history.

(56) References Cited

U.S. PATENT DOCUMENTS

| | | | |
|---|---|---|---|
| 5,623,598 A | 4/1997 | Voigt et al. | |
| 6,934,578 B2 | 8/2005 | Ramseth | |
| 2004/0051721 A1 | 3/2004 | Ramseth | |
| 2004/0054294 A1 | 3/2004 | Ramseth | |
| 2004/0054295 A1 | 3/2004 | Ramseth | |
| 2006/0288284 A1* | 12/2006 | Peters et al. ................. | 715/700 |

FOREIGN PATENT DOCUMENTS

EP 0778001 11/1996

* cited by examiner

*Primary Examiner*—Edward Raymond

(57) ABSTRACT

Provided are, among other things, systems, methods and techniques for facilitating visual analysis of data relationships. Initially, a set of data values is obtained, and a graphical display of the data values is output, with different display points corresponding to different data values. A user selection of an area encompassing at least a portion of the graphical display is input, and data correlation analyses are performed between data values within the selected area other sets of data values. Graphs are then displayed based on results of the data correlation analyses.

21 Claims, 7 Drawing Sheets
(6 of 7 Drawing Sheet(s) Filed in Color)

FOCUS-BASED VISUAL ANALYTIC TECHNIQUES FOR EXPLORING DATA RELATIONSHIPS

FIELD OF THE INVENTION

The present invention pertains to systems, methods and techniques for facilitating visual analysis of graphically displayed data.

BACKGROUND

A variety of different systems exist for allowing a user to view large quantities of data. However, such conventional techniques generally do not provide adequate tools to allow an analyst to fully investigate the causes of interesting patterns or anomalies in the data he or she is viewing.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF THE PREFERRED EMBODIMENT(S)

The present disclosure is related to the disclosure in the commonly assigned concurrently filed patent application titled "Graphic Color-Pixel-Based Visual-Analytic Representations for Datasets" (the "Graphic Representation Application"), which application is incorporated by reference herein as though set forth herein in full. In certain embodiments, the present invention is used in conjunction with the display techniques described in the Graphic Representation Application.

The techniques described in the Graphic Representation Application often can allow a user to easily and flexibly visualize a large amount of data. The present techniques can provide the user with additional functionality for quickly and flexibly analyzing large quantities of data. However, it is noted that the techniques described herein can be used with any of a variety of other data-display techniques, instead of or in addition to the display techniques described in the Graphic Representation Application.

Figure 1A:
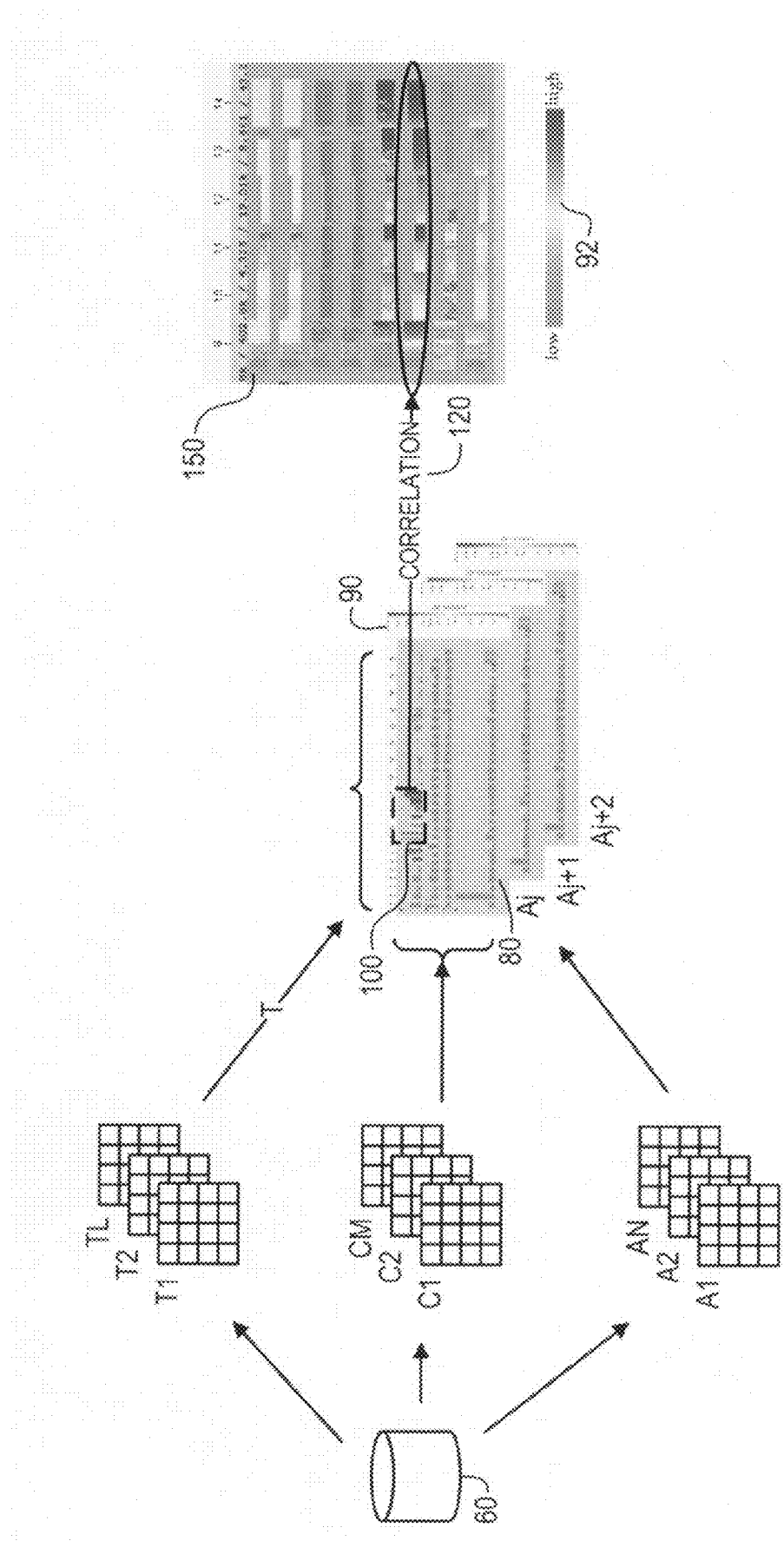
FIG. 1A is a block diagram showing the use of a visual analytic technique within the context of attributes pertaining to data-warehouse loading jobs, according to a representative embodiment of the present invention.
Figure 1B:
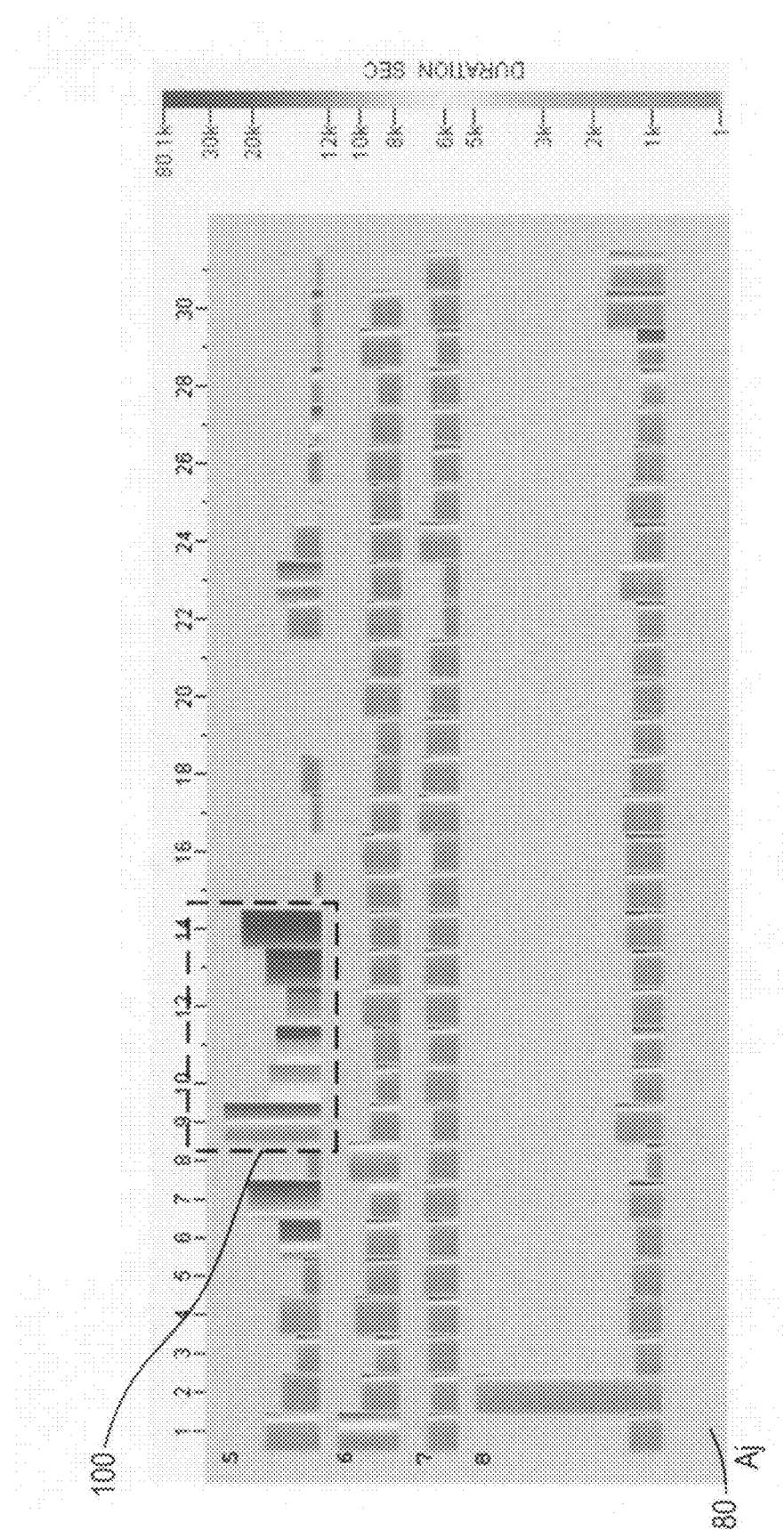
FIG. 1B shows an enlarged view of a display screen showing an initial graphical display and a user selection of a local focus area according to a representative embodiment of the present invention.
Figure 2:
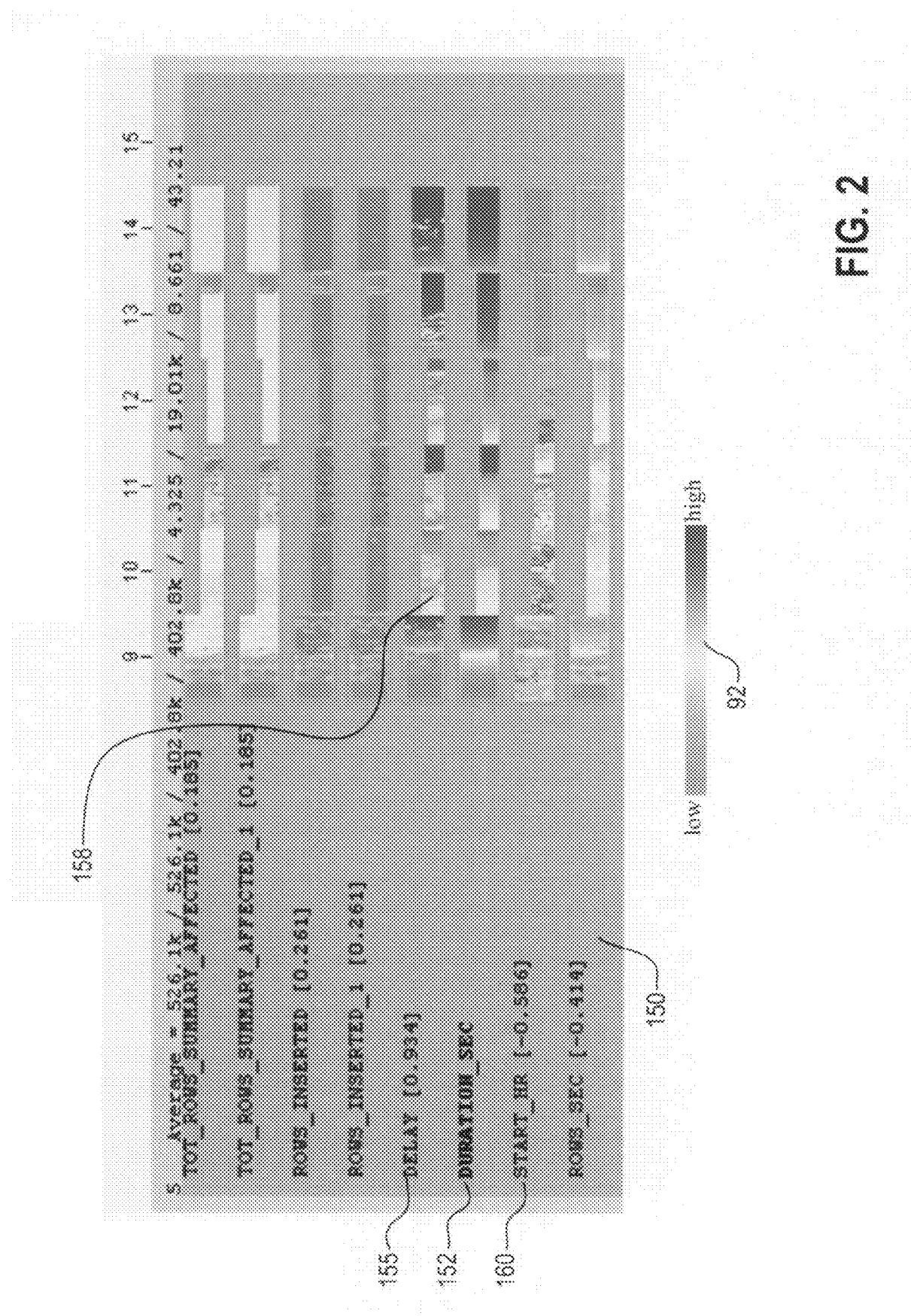
FIG. 2 shows an enlarged view of a display screen showing correlation results in the data-warehouse loading example, according to a representative embodiment of the present invention.

FIG. 1A is a block diagram showing the use of a visual analytic technique according to a representative embodiment of the present invention, with FIGS. 1B and 2 showing enlarged portions of certain aspects of FIG. 1A. As shown in FIG. 1A, from the user's perspective, the preferred embodiments of the present invention involve four main steps.

First, records are selected from a data warehouse 60 based on the user's specified criteria. As shown, in the present embodiment data warehouse 60 contains a multi-dimensional dataset, and each data record has an associated time T (e.g., T1, T2, ... TL), category C (e.g., C1, C2, ... CM) and attribute A (e.g., A1, A2, ... AN). In the present embodiment, in which data initially are displayed using techniques described in the Graphic Representation Application, a matrix 80 is constructed using T, C, and A for the corresponding columns, rows, and color charts in a graph. One or more color scales 90 indicate the data values to which colors correspond. Here, the T (horizontal) axis is labeled by the day of the month, the C (vertical) axis is labeled by the month (i.e., each row corresponds to a different month), and a variety of different data attributes A have been measured with respect to each point in time.

Second, the user selects (or "rubber bands") a local focus area 100 within the graphical display 80 to perform a focus-based visual analytic query. This can be accomplished by the user simply drawing a box around the desired area 100 using a mouse or other computer pointing device. In the present example, the focus area 100 is within the display corresponding to the job duration attribute.

Third, records within the local focus area 100 are retrieved from data warehouse 60 and then correlation analyses 120 are performed in order to find the amount of correlation between the current attribute (i.e., the attribute of the selected local focus area 100, here, job duration) and all other attributes (i.e., Ai, i=1 ... N).

Fourth, the results are rendered and composed into an output display graph 150, again having corresponding color charts that indicate the displayed data values. For ease of illustration (because different attributes typically have different measurement units), FIGS. 1A and 2 display just a single generic color chart 92, indicating that the green end of the spectrum corresponds to low data values and the red end of the spectrum corresponds to high data values.

As shown in FIG. 2, job duration 152 has strong positive correlation with execution delay 155 (the attribute of the focus area 100); that is, their values change at the same pace for the most part. However, even with its strong correlation, there still are exception points (e.g., exception points 158 which are colored green) in bar 155 that are not fully correlated with the corresponding points in bar 152. It often is valuable to be able to identify such exception points. The ability to do so results from the way in which the individual cells are ordered within the displayed bars, which is discussed in more detail below.

Also in FIG. 2, execution runtime 152 has negative correlation with starting time 160, so that their values generally change in opposite directions (e.g., when one moves toward the red end of the spectrum, the other generally moves toward the green end of the spectrum, and vice versa). However, as can be seen in FIG. 2, once again exception points exist.

It should be noted that the foregoing example is representative only. As discussed in more detail below, a user preferably has a great deal of flexibility in determining what data to display and how, and then to have correlations performed automatically so that the user can view the results. In other words, the present invention generally provides a flexible tool to facilitate local-focus intelligent queries, providing a visual analytic approach for quick identification of correlations, particularly from multi-dimensional datasets.

Figure 3:
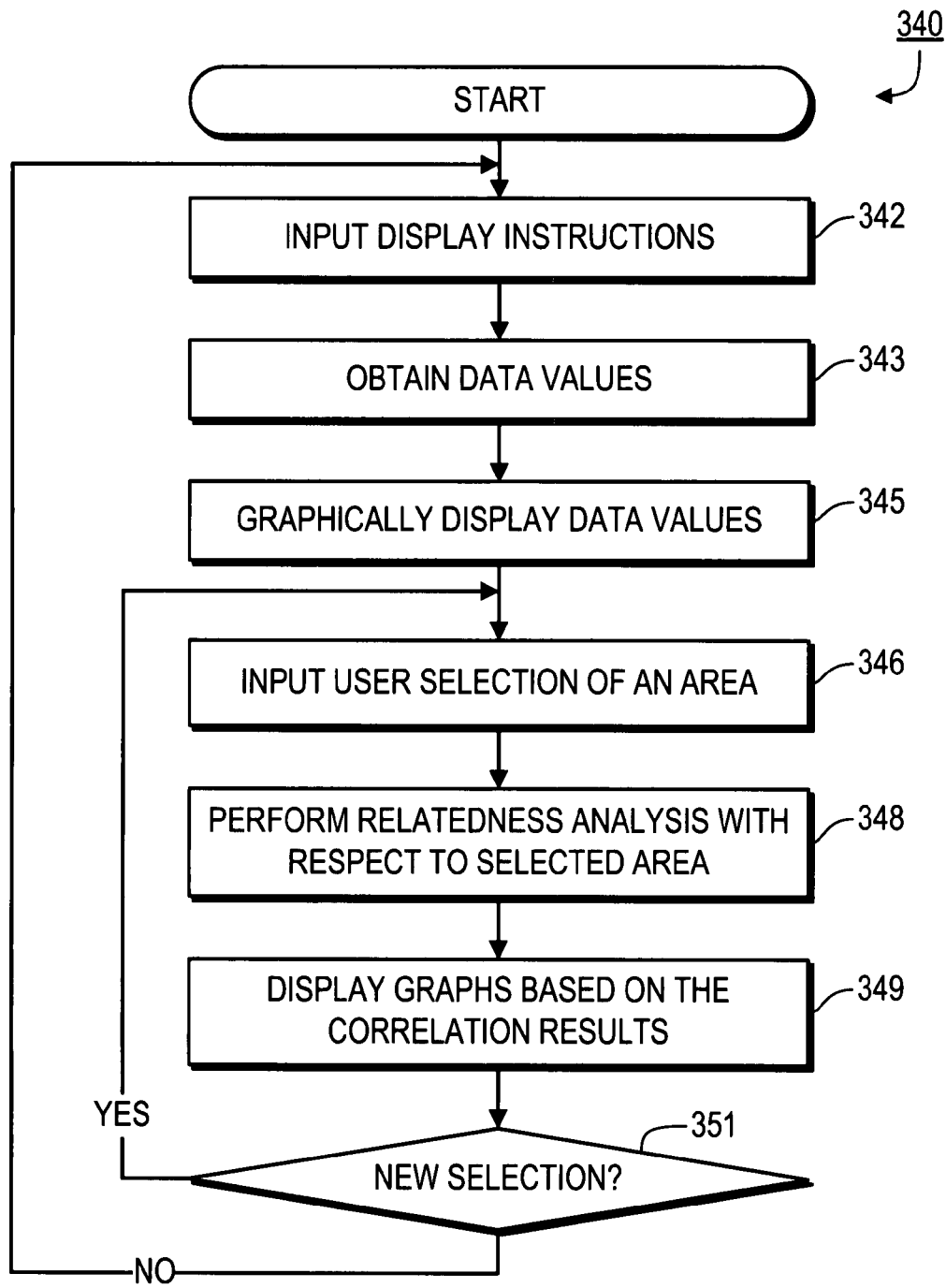
FIG. 3 illustrates a flow diagram of a process for exploring data correlations based on a user selection of a portion of a displayed graph, according to a representative embodiment of the present invention.

The foregoing example provides a brief overview of a representative embodiment of the present invention, primarily from the user's perspective. FIG. 3 illustrates a flow diagram of a process 340 for facilitating visual analysis of data relationships by graphically displaying data and then allowing a user to more closely analyze selected portions of that displayed data, e.g., in order to investigate relationships among different sets of data. The processing steps shown in FIG. 3 preferably are implemented entirely in software, but in alternate embodiments are implemented in any of the other ways described herein.

Initially, in step 342 display instructions are input, preferably in real time, from a user of a system implementing process 340. In this regard, process 340 preferably has access to a large data warehouse (e.g., data warehouse 60) of multi-dimensional data. As discussed in more detail above, the user preferably has the ability to specify particular kinds of data to be displayed, as well as how such data are to be displayed.

In one representative embodiment, data warehouse 60 stores a multi-dimensional dataset, such as data for a number of different categories, with each category having a number of different attributes, with all the categories having the same kinds of attributes, and with the data values for individual attributes of individual categories varying over time. In one example, the categories are different computer network servers, and the attributes for each server are different performance or environmental characteristics.

From among this large collection of data, a user preferably is provided with the ability to customize the display so that it will be most meaningful to him or her. In certain embodiments, any of the techniques described in the Graphic Representation Application are used for this purpose in the preferred embodiments. In alternate embodiments, any other graphical display technique can be selected, e.g., parallel coordinates or scatterplot.

In step 343, the data values corresponding to the instructions input in step 342 are retrieved from the information data warehouse (e.g., data warehouse 60). Then, in step 345 those data values are graphically displayed, e.g., using the techniques of the Graphic Representation Application. In any event, it is preferred that a high-resolution display technique is used, e.g., one that is capable of displaying the values of individual data records for a large quantity of data, such as by making the color of each displayed cell representative of a different data value in the data warehouse 60.

Figure 4:
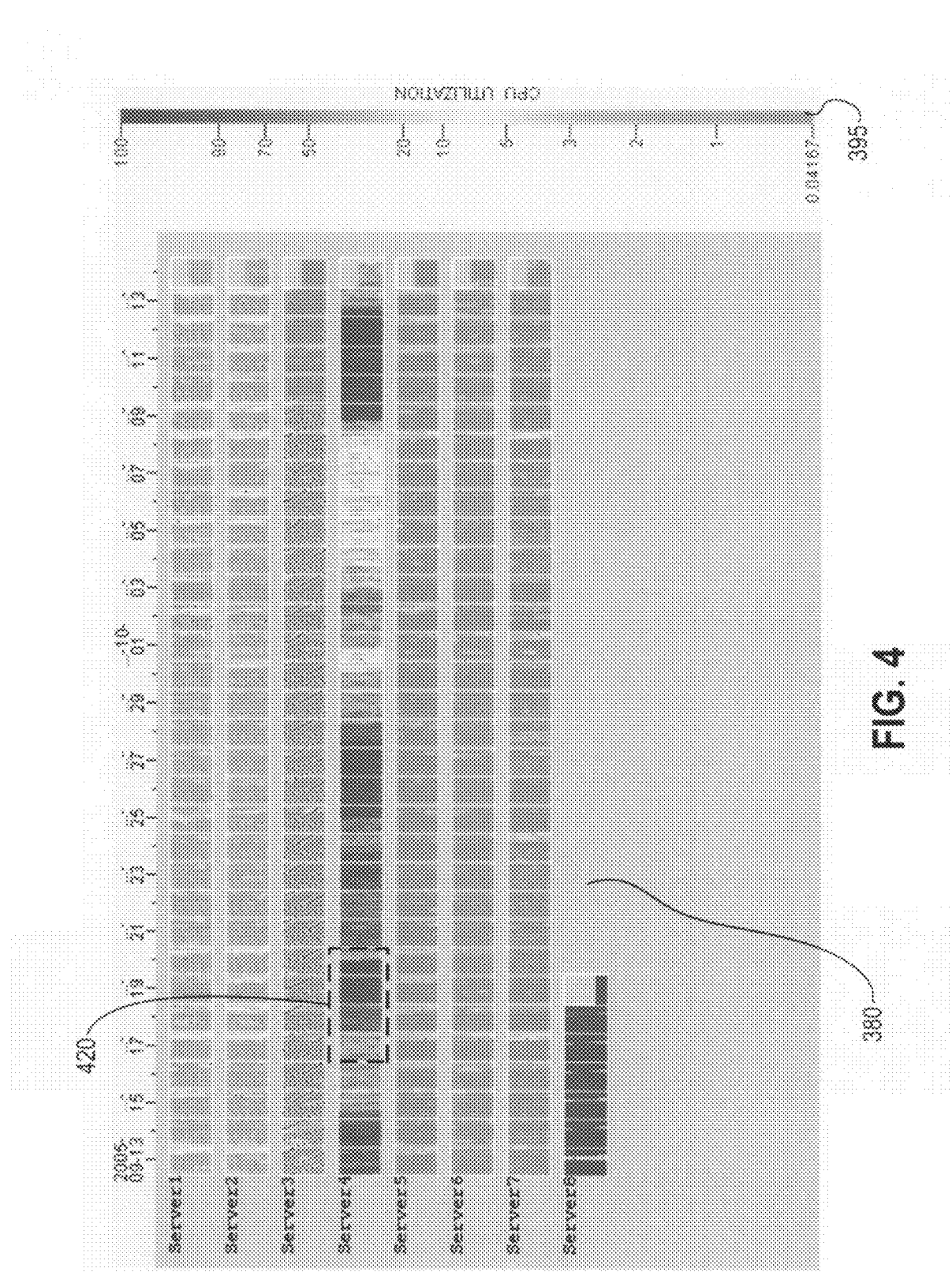
FIG. 4 illustrates an initial display of data values and a user selection of a focus area for correlation analysis according to a representative embodiment of the present invention.

An example of a display 380 produced by this step 345 is shown in FIG. 4. The displayed data in FIG. 4 are the data values for a single attribute (in this case, CPU utilization) across multiple different servers 1-8 (the servers being the categories in the present example).

In this case, the ordering index is the timestamp indicating when the corresponding data value was collected or measured. In other words, all of the data are ordered based on time of collection, with the displayed bars segmented into one-day blocks. Because only a single attribute is illustrated, a single color chart 395 serves as the color key for the entire display 380.

Returning to FIG. 3, in step 346 a user's selection of an area 420 encompassing at least a portion of the display 380 is input. Such a selection preferably is made by the user whenever the user wishes to more closely investigate a particular portion of any graphically displayed data. This can be the case, for example, if the user identifies an apparent anomaly or a period of time during which the displayed data values exhibit some interesting pattern or unusually high or low values.

In the preferred embodiments, the user makes the selection by simply a graphically designating a desired portion of the display (a "focus area") using a computer mouse or other pointing device. Thus, for example, referring again to FIG. 4, a user has drawn a box 420 around a particular portion of the display 380 (sometimes referred to herein as "rubber banding"), and has signaled his or her desire (e.g., by clicking a user-interface button) to more closely investigate the data within the focus area by performing correlation analyses.

In step 348, a correlation analysis is performed with respect to the selected focus area 420. Preferably, individual correlation analyses are performed between the data values within the focus area 420 and data values for each of the multiple other identified sets of data values. More preferably, each such other identified set of data values includes the data values for another attribute that correspond to the data values within the selected focus area 420. The other sets of data values frequently referred to as "attributes" herein.

In the preferred embodiments, each such correlation analysis involves a calculation of the correlation coefficient between the data values within the selected focus area 420 and the other attributes. In alternate embodiments, any other correlation analysis can be performed. For example, such alternate correlation analyses can include any functions of the correlation coefficient, the mean absolute difference or the mean absolute ratio. Still further, the correlation analysis can look for similar patterns of transients, similar spectral patterns, similar gradient patterns or any other relatedness criterion.

More generally, each of the correlation analyses performed in this step 348 evaluates the relatedness (with respect to some specified relatedness criterion, such as correlation coefficient) of other attributes to the selected segment 420. Often, a large number of correlation analyses are performed in this step 348, sometimes hundreds or thousands.

In step 349, a number of graphs preferably are displayed based on the correlation-analysis results. In the preferred embodiments, the attributes whose corresponding data values that turned out to be most correlated to the selected area 420, based on the analysis performed in step 348, are identified and graphically displayed in close proximity to the selected area 420.

Figure 5:
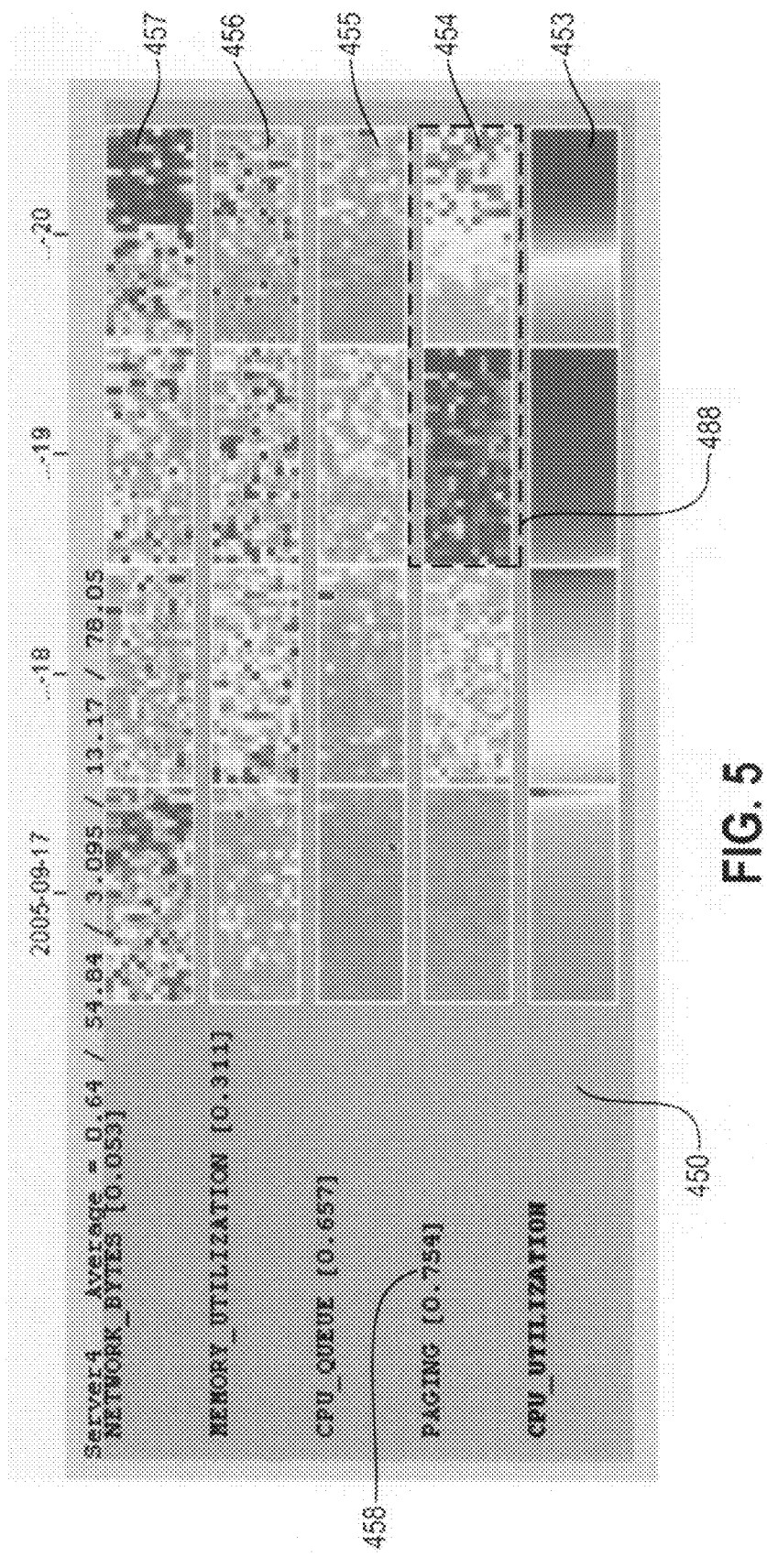
FIG. 5 illustrates a display of the results of a correlation analysis according to a representative embodiment of the present invention.

An exemplary display 450 produced by this step 349 is shown in FIG. 5. Here, the data values within the selected focus area 420 (on the page displaying the CPU utilization attribute) were compared (by correlation analysis) against the data values for all other attributes over the same four-day time interval corresponding to the selected area 420. The data values for the selected focus area 420 are displayed in bar 453. The most highly correlated sets of data values (corresponding to different attributes) are then displayed closest to bar 453, in order of degree of correlation, in order to facilitate comparison by the user.

For example, bar 454 (corresponding to the Paging attribute) is displayed immediately adjacent to bar 453 because it is the most highly correlated with bar 453 (e.g., as shown by calculated and displayed correlation coefficient 458). In general, with a few exceptions, bar 454 generally exhibits the same patterns as bar 453. Bars 455-457 are progressively less correlated with bar 453.

It is noted that the individual data attribute values of display 450 are aligned across all of the bars 454-457, so that correspondingly positioned cells represent corresponding data values. In the preferred embodiments, the order of the cells in the local focus area 420 determines the order of the cells for the other sets of data values (e.g., other attributes) in the display 450. This alignment facilitates easy comparison of individual data values across the various bars 454-457. Accordingly, e.g., if the cells were sorted in display 380 within each segment from low data values to high data values, then that order is maintained in display 450 for bar 453, and the index for each cell in bar 453 is used as the index of the corresponding cell position for each of bars 455-457.

It is noted that because different attributes are being displayed in FIG. 5, different color charts preferably are provided for each different attribute. However, for ease of illustration, in the example shown in FIG. 5 such color charts are omitted. For each attribute, the green and of the spectrum indicates low data values (or acceptable data values) and the red end of the spectrum indicates high data values (or unacceptable data values).

Returning to FIG. 3, in step 351 a determination is made as to whether the user has requested a correlation analysis with respect to some portion of the displayed data. For example, the user preferably can submit such a request by graphically selecting an area of the displayed values (e.g., selection 488 in FIG. 5) and then clicking a button clicking the user's desire to run correlation analyses with respect to the selected focus area 488.

Such a request is particularly useful for identifying relationships that might not otherwise be discovered. For example, the automatic correlation analysis identifies the attributes that are most highly correlated over the entire local focus area 420. Then, when visually comparing the data values for the focus area 420 to the data values for such most-correlated attributes, it is possible to identify "exception points" where the strong overall correlation does not apply. Such identification is relatively easy because, as noted above, the cells for the displayed bars are aligned with each other (e.g., based on the ordering of the cells in the focus area 420). Thus, in local focus area 488 there are a large number of cells that do not fit within the pattern of the corresponding portion of bar 453.

If such a request has been made, then processing returns to step 346 to begin the process of generating a new display based on the selection. That is, a correlation analysis is performed with respect to the new selection 488 and designated sets of data values (typically, data values for the other attributes corresponding to the same range of indexes), and displaying the results (e.g., the same manner described above). If no such request is made, processing returns to step 342 to await display instructions, e.g., for an entirely different graphical data display.

Figure 6:
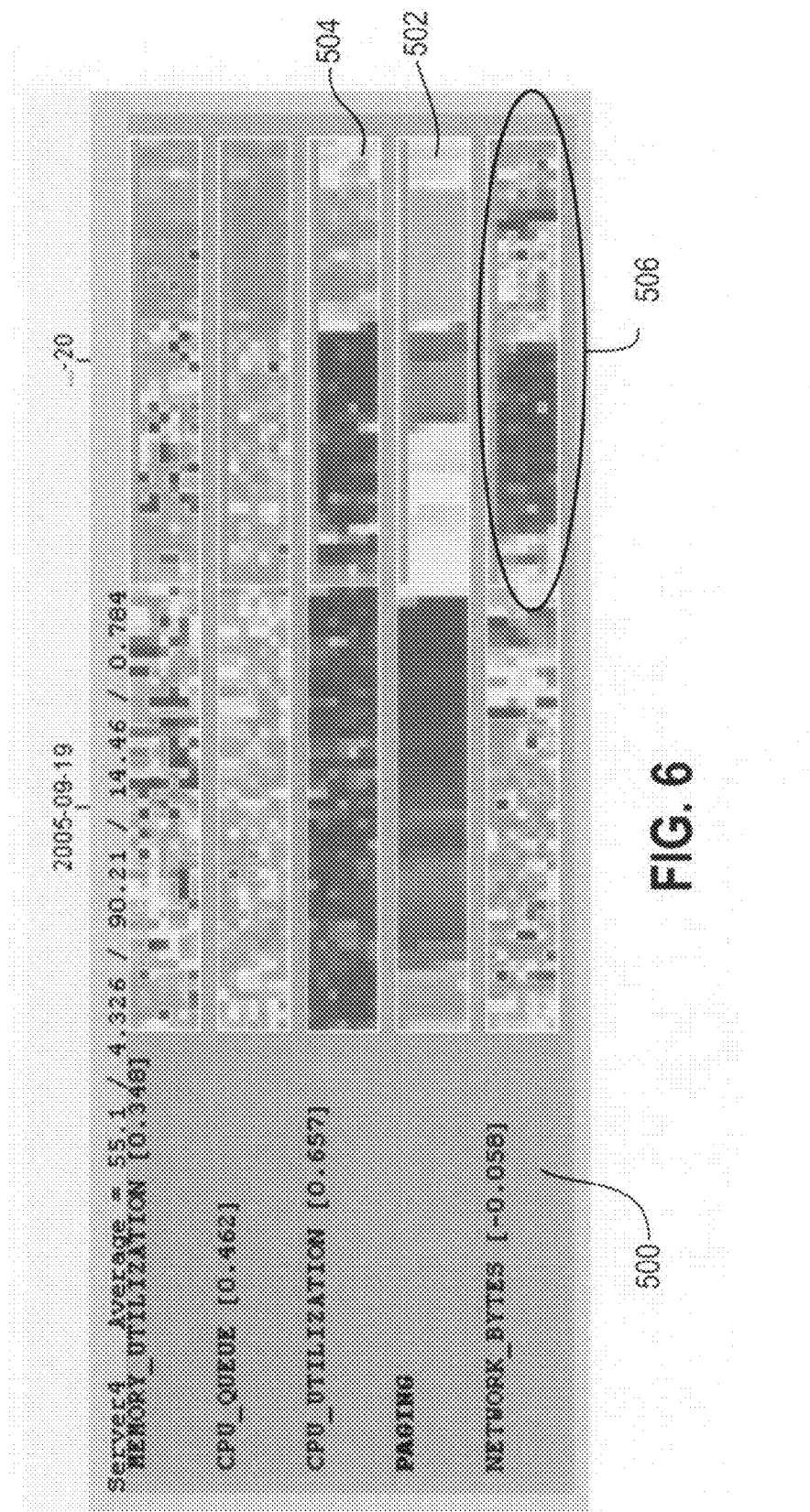
FIG. 6 illustrates a further display of correlation results according to a representative embodiment of the present invention.

FIG. 6 illustrates a display 500 that is generated upon completion of the correlation analysis with respect to focus area 488. Here, the data values in the focus area 488 are represented by bar 502. As shown in FIG. 6, even over the smaller focus area 488, the strongest correlation still is with CPU utilization, which is represented by bar 504. Although Network Bytes as a very weak overall correlation, the data 506 on September 20 visually appears to have some significant correlation with the Paging data on that day. Accordingly, this relationship might be explored in greater detail.

By virtue of the foregoing processes, a user is able not only to view large amounts of data, but also to iteratively request correlation analyses for desired portions of the graphically displayed data. Such a technique is particularly helpful in allowing a user to easily identify and then more closely examine local patterns or relationships, including for example, a group of "exception" data points, i.e., relatively shorter segments for which a strong correlation over a relatively longer segment does not apply.

In particular, the combination of automatically identifying highly correlated longer segments and then displaying them in a manner so as to facilitate visual comparisons, together with allowing a user to then repeat the process with progressively shorter segments or windows, often can permit identification of relationships that conventional approaches would miss.

System Environment.

Generally speaking, except where clearly indicated otherwise, all of the systems, methods and techniques described herein can be practiced with the use of one or more programmable general-purpose computing devices. Such devices typically will include, for example, at least some of the following components interconnected with each other, e.g., via a common bus: one or more central processing units (CPUs); read-only memory (ROM); random access memory (RAM); input/output software and circuitry for interfacing with other devices (e.g., using a hardwired connection, such as a serial port, a parallel port, a USB connection or a firewire connection, or using a wireless protocol, such as Bluetooth or a 802.11 protocol); software and circuitry for connecting to one or more networks (e.g., using a hardwired connection such as an Ethernet card or a wireless protocol, such as code division multiple access (CDMA), global system for mobile communications (GSM), Bluetooth, a 802.11 protocol, or any other cellular-based or non-cellular-based system), which networks, in turn, in many embodiments of the invention, connect to the Internet or to any other networks); a display (such as a cathode ray tube display, a liquid crystal display, an organic light-emitting display, a polymeric light-emitting display or any other thin-film display); other output devices (such as one or more speakers, a headphone set and a printer); one or more input devices (such as a mouse, touchpad, tablet, touch-sensitive display or other pointing device, a keyboard, a keypad, a microphone and a scanner); a mass storage unit (such as a hard disk drive); a real-time clock; a removable storage read/write device (such as for reading from and writing to RAM, a magnetic disk, a magnetic tape, an opto-magnetic disk, an optical disk, or the like); and a modem (e.g., for sending faxes or for connecting to the Internet or to any other computer network via a dial-up connection). In operation, the process steps to implement the above methods and functionality, to the extent performed by such a general-purpose computer, typically initially are stored in mass storage (e.g., the hard disk), are downloaded into RAM and then are executed by the CPU out of RAM. However, in some cases the process steps initially are stored in RAM or ROM.

Suitable devices for use in implementing the present invention may be obtained from various vendors. In the various embodiments, different types of devices are used depending upon the size and complexity of the tasks. Suitable devices include mainframe computers, multiprocessor computers, workstations, personal computers, and even smaller computers such as PDAs, wireless telephones or any other appliance or device, whether stand-alone, hard-wired into a network or wirelessly connected to a network.

In addition, although general-purpose programmable devices have been described above, in alternate embodiments one or more special-purpose processors or computers instead (or in addition) are used. In general, it should be noted that, except as expressly noted otherwise, any of the functionality described above can be implemented in software, hardware, firmware or any combination of these, with the particular implementation being selected based on known engineering tradeoffs. More specifically, where the functionality described above is implemented in a fixed, predetermined or logical manner, it can be accomplished through programming (e.g., software or firmware), an appropriate arrangement of logic components (hardware) or any combination of the two, as will be readily appreciated by those skilled in the art.

It should be understood that the present invention also relates to machine-readable media on which are stored program instructions for performing the methods and functionality of this invention. Such media include, by way of example, magnetic disks, magnetic tape, optically readable media such as CD ROMs and DVD ROMs, or semiconductor memory such as PCMCIA cards, various types of memory cards, USB memory devices, etc. In each case, the medium may take the form of a portable item such as a miniature disk drive or a small disk, diskette, cassette, cartridge, card, stick etc., or it may take the form of a relatively larger or immobile item such as a hard disk drive, ROM or RAM provided in a computer or other device.

The foregoing description primarily emphasizes electronic computers and devices. However, it should be understood that any other computing or other type of device instead may be used, such as a device utilizing any combination of electronic, optical, biological and chemical processing.

Additional Considerations.

In certain embodiments, the correlation analysis compares certain default attributes against the data values in the selected focus area, so that the user need not specify them in each instance (beyond selecting the area itself). In other embodiments, the sets of data to be processed relative to the selected focus area are determined automatically, as a default, once the user has selected the focus area on the graphical display, but the user also has the ability to alter or supplement these default sets of data, so as to customize the display according to his or her needs.

In the preferred embodiments of the invention, the process 340 preferably provides the user with a great deal of flexibility in selecting the kinds of data to be examined. Such flexibility preferably extends, not only to different definitions of particular parameters, but also to different time offsets and/or other variations with respect to any given parameter or set of parameters. For example, a user might suspect that one attribute has a delayed impact on another, but is not quite sure how long the delay is. In such a case, the user preferably has the ability to request correlation analyses at multiple different time offsets.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A method of facilitating visual analysis of data relationships, comprising:
   (a) obtaining a set of data values;
   (b) outputting a graphical display of the data values, with different display points corresponding to different data values;
   (c) inputting a user selection of an area encompassing at least a portion of the graphical display;
   (d) performing, by a computer, a plurality of data correlation analyses between data values within the area selected in step (c) and a plurality of other sets of data values, wherein the plurality of other sets of data values are outside of the area; and
   (e) displaying a plurality of graphs based on results of the data correlation analyses in step (d).

2. A method according to claim 1, wherein the data values are displayed in step (b) as a time sequence.

3. A method according to claim 1, wherein the user selection is input in step (c) in response to a user graphically designating the area using an input device.

4. A method according to claim 1, wherein the data values in the area are for a first attribute, wherein the other sets of data values comprise different attributes in a multi-dimensional data set, and wherein the different attributes are different from the first attribute and are outside of the area.

5. A method according to claim 1, wherein at least one of the other sets of data values corresponds to a same index range occupied by the data values within the area selected in step (c).

6. A method according to claim 1, further comprising a step of repeating steps (d) and (e) in response to a user selection of a portion of one of the plurality of graphs displayed in step (e).

7. A method according to claim 1, wherein the displaying in step (e) comprises a graphical display of the data values within the area selected in step (c) in proximity to a graphical display of a plurality of the other sets of data values that indicated a high correlation to the data values within the area selected in step (c).

8. A method according to claim 1, wherein in the graphical display output by step (b), different data values are represented by differently colored cells.

9. A method according to claim 1, wherein the graphs are displayed in step (e) by aligning corresponding cells across the plurality of graphs.

10. A method according to claim 1, wherein the graphs displayed in step (e) include a first graph of the data values within the area selected in step (c) and individual graphs of each of the plurality of other sets of data values, and wherein the graphs are displayed in step (e) by arranging the individual graphs such that the individual graphs corresponding to the other sets of data values that are more related to the data values in the area selected in step (c) are displayed spatially closer to the first graph.

11. A method according to claim 1, wherein the data correlation analyses comprise calculation of a correlation coefficient, wherein the correlation coefficient between the data values within the area and each of the other sets of data values is based on similarity of patterns of the data values within the area and the data values in each other set.

12. A method of facilitating visual analysis of data relationships, comprising:
(a) obtaining a set of data values;
(b) outputting a graphical display of the data values, with different display points corresponding to different data values;
(c) inputting a user selection of an area encompassing at least a portion of the graphical display;
(d) processing, by a computer, the data values within the area selected in step (c) against a plurality of other sets of data values in order to identify at least one related set of data values, wherein the plurality of other sets of data values are outside of the area; and
(e) graphically displaying a comparison of the data values within the area selected in step (c) and the at least one related set of data values identified in step (d).

13. A method according to claim 12, wherein the user selection is input in step (c) in response to a user graphically designating the area using an input device.

14. A method according to claim 12, further comprising a step of repeating steps (d) and (e) in response to a user selection of a portion of the comparison displayed in step (e).

15. A method according to claim 12, wherein in the graphical display output by step (b), different data values are represented by differently colored cells.

16. A method according to claim 12, wherein the processing in step (d) comprises calculation of a correlation coefficient, wherein the correlation coefficient between the data values within the area and each of the other sets of data values is based on similarity of patterns of the data values within the area and the data values in each other set.

17. A non-transitory computer-readable storage medium storing computer-executable instructions for facilitating visual analysis of data relationships, said instructions upon execution by a computer performing process steps comprising: (a) obtaining a set of data values; (b) outputting a graphical display of the data values, with different display points corresponding to different data values; (c) inputting a user selection of an area encompassing at least a portion of the graphical display; (d) performing a plurality of data correlation analyses between data values within the area selected in step (c) and a plurality of other sets of data values, wherein the plurality of other sets of data values are outside of the area; and (e) displaying a plurality of graphs based on results of the data correlation analyses in step (d).

18. A non-transitory computer-readable storage medium according to claim 17, wherein the user selection is input in step (c) in response to a user graphically designating the area using an input device.

19. A non-transitory computer-readable storage medium according to claim 17, wherein said process steps further comprise a step of repeating steps (d) and (e) in response to a user selection of a portion of one of the plurality of graphs displayed in step (e).

20. A non-transitory computer-readable storage medium according to claim 17, wherein in the graphical display output by step (b), different data values are represented by differently colored cells.

21. A non-transitory computer-readable storage medium according to claim 17, wherein the plurality of graphs include a first graph corresponding to the data values in the area, and wherein displaying the plurality of graphs comprises: identifying which of the other sets of data values is most closely related to the data values in the area; and displaying a graph of the plurality of graphs corresponding to the identified other set in closest proximity to the first graph.

* * * * *